Dec. 11, 1962     P. H. SHEA     3,067,695
AERIAL CABLE CONNECTOR ASSEMBLY
Filed July 10, 1958     2 Sheets-Sheet 1
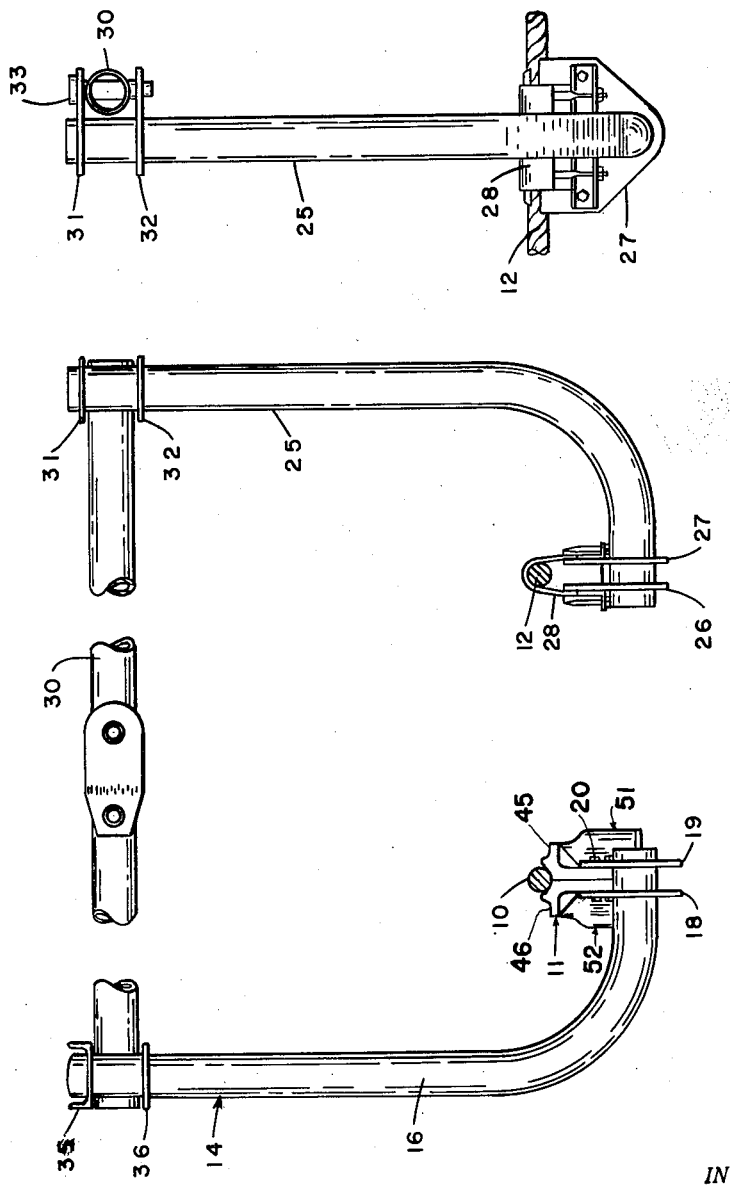
INVENTOR.
PATRICK H. SHEA
BY
ATTORNEYS Dec. 11, 1962 P. H. SHEA 3,067,695
AERIAL CABLE CONNECTOR ASSEMBLY
Filed July 10, 1958 2 Sheets-Sheet 2

INVENTOR.
PATRICK H. SHEA
ATTORNEYS

United States Patent Office 3,067,695
Patented Dec. 11, 1962

3,067,695
AERIAL CABLE CONNECTOR ASSEMBLY
Patrick Hall Shea, Hampton, Va., assignor to the United States of America as represented by the Secretary of the Army
Filed July 10, 1958, Ser. No. 747,803
1 Claim. (Cl. 104—112)
(Granted under Title 35, U.S. Code (1952), sec. 266)

The invention described herein may be manufactured and used by or for the Government for governmental purposes without the payment of any royalty thereon.

This invention relates to devices for interconnecting adjacent ends of cables for aerial tramways and for maintaining the connectors for the junctions of cables in proper position.

An object of the invention is to provide a connector to receive the adjacent ends of two sections of cable, afford a smooth connection between the cable ends, and at the same time to maintain the connection in an upright position so as to overcome normal twisting movement or torsion of the cable and maintain a substantially smooth trackway for the wheels or sheaves of a cable car, thereby avoiding jostling or shaking of the car and the danger of the wheels being thrown off the trackway.

Another object is to provide a cable connector comprising at least two separable parts which can be assembled together to provide mutually opposed sockets for cable end terminals, such parts being secured in an assembled relationship by releasable fasteners, such as ordinary bolts and nuts.

Further objects and a more complete understanding of the invention may be obtained by referring to the following description and claims taken in conjunction with the accompanying drawings which show an illustrative embodiment of the construction forming the basis of the invention and in which—

FIG. 1 is a transverse, cross-sectional view of a cable car trackway showing a cable connector constructed in accordance with the invention in combination with structure for holding the cable connector in upright position;

FIG. 2 is an end elevational view looking from the right-hand end of the assembly shown in FIG. 1;

Figure 3:
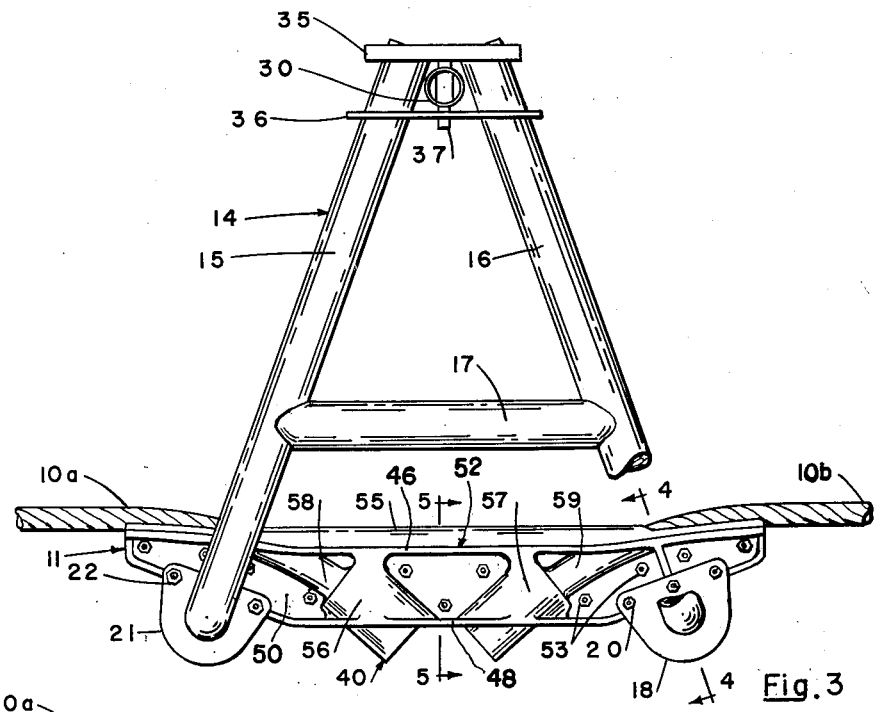
FIG. 3 is an end elevational view looking from the left-hand end of the assembly shown in FIG. 1.

With continued reference to the drawings, the trackway cable is indicated at 10 in FIG. 1, and two interconnected sections of this cable are shown in FIGS. 3 and indicated at 10–a and 10–b. The adjacent ends of cable sections 10–a and 10–b are interconnected by a connector, generally indicated at 11, and this connector is held in substantially upright position by structure particularly illustrated in FIGS. 1, 2, and 3.

Figure 4:
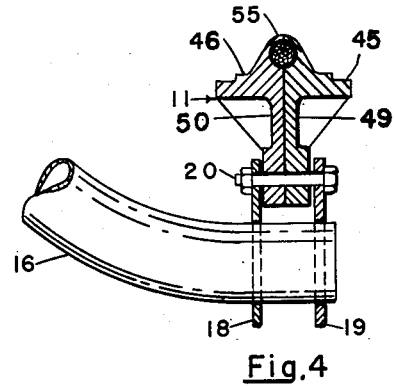
FIG. 4 is a transverse cross-sectional view substantially on a plane indicated by the line 4—4 of FIG. 3.

A tramway cable 12, FIG. 1, which may be a second trackway cable, is disposed in spaced and substantially parallel relationship to trackway cable 10 and is maintained under tension. A-frame structure 14 is disposed at one side of connector 11, and comprises a pair of tubular legs 15 and 16 converging symmetrically upwardly and interconnected intermediate their lengths by tubular cross member or brace 17. Legs 15 and 16 are curved so that the lower end portions of the legs are disposed substantially perpendicular to the upper portions and a pair of spaced-apart plates, as indicated at 18 and 19 for the leg 16, are secured on the lower end portion of each leg. These plates are apertured to receive the lower end portions of the corresponding frame legs and are spaced apart to receive the adjacent lower portion of connector 11 therebetween. When the connector is in assembled relationship with A-frame 14, plates 18 and 19 are secured to the connector by suitable bolts, as indicated at 20 in FIGS. 3 and 4, extending through the upper portions of the plates and through the portion of the connector received between the plates. One of the corresponding plates for leg 15 is shown in FIG. 3 and indicated at 21, and the bolts connecting the corresponding end of connector 11 to these plates are indicated at 22.

In FIGS. 1 and 2, tubular strut 25 is disposed at the side of the tramway cable 12 remote from cable 10 and is bent intermediate its length so that its lower end portion is disposed substantially perpendicular to its upper end portion. Plates 26 and 27 are secured in spaced-apart and parallel relationship on the lower end portion of strut 25 and are detachably connected at their upper edges to saddle structure 28 mounted on cable 12.

Cables 10 and 12 normally have their center lines substantially in a common horizontal plane and the center lines of A-frame 14 and strut 25 are substantially in a plane perpendicular to the center lines of both cables 10 and 12.

A-frame 14 and strut 25 extend upwardly from corresponding cables 10 and 12 substantially equal distances with their upper portions in substantially parallel relationship, and link 30 extends between the upper end portions of the A-frame and the strut. A pair of plates 31 and 32 are secured in spaced-apart and parallel relationship on the upper end portion of strut 25 and these plates extend to one side of the strut. The corresponding end of link 30 is disposed between the laterally extending portions of plates 31 and 32 and pin 33 extends through the plate extensions and diametrically through the end portion of link 30 to rigidly connect this end of the link to the upper end of strut 25. Link 30 may be of single piece construction or may be of two or more sections of an adjustable nature permitting variations in the spacing between A-frame 14 and strut 25 by adjustable means well known in the art.

Channel member 35 and plate 36 are secured in spaced-apart and parallel relationship on the upper ends of legs 15 and 16 of A-frame 14, and the corresponding end of link 30 extends between this channel member and plate. Pin 37 extends through channel member 35, plate 36 and diametrically through the corresponding end portion of link 30 to rigidly secure this end of the link to the upper end of A-frame 14. The above described structure holds the connector 11 in upright position and restrains this connector from turning and the cable sections from twisting or unwinding when subjected to the load of a cable car.

Figure 6:
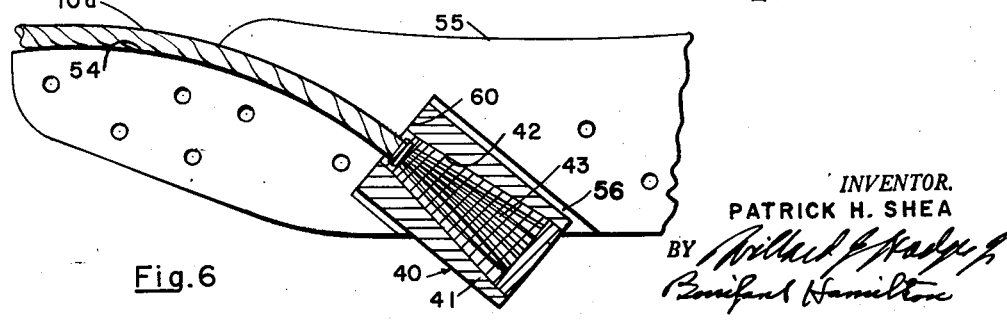
FIG. 6 is a fragmentary, longitudinal cross-sectional view substantially on a plane indicated by the line 6—6 of FIG. 5.

An enlarged terminal formation, as indicated at 40 in FIG. 6, is provided on each end of each cable section. Each of these terminal formations comprises a cylindrical sleeve 41 having therein a conical bore 42, the smaller end of which is only slightly larger in diameter than the diameter of the trackway cable sections. The cable end is splayed out in bore 42, as indicated at 43, and the bore is filled with lead or a suitable solder which surrounds the strands of the cable end and fills the bore.

Figure 5:
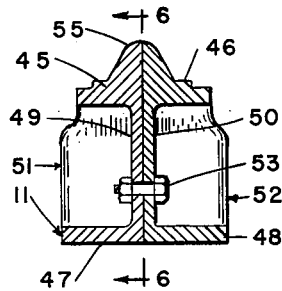
FIG. 5 is a transverse cross-sectional view substantially on a plane indicated by the line 5—5 of FIG. 3.

Connector 11 comprises two substantially identical mutually opposed members 51 and 52 which are separable on a plane extending substantially along the center lines of cable sections 10–a and 10–b and connector 11 itself. These members are generally of channel shape, as shown in FIG. 5, having upper flanges 45 and 46, lower flanges 47 and 48, and webs 49 and 50. The two members are assembled with the outer surfaces of their webs 49 and 50 in contact and with their edges in registry and are releasably secured together by suitable means, such as bolts 53 extending through registering apertures in web portions 49 and 50. When the two mutually opposed members 51 and 52 are secured together to constitute the complete connector 11, this connector has an upper edge constituted in part by flanges 45 and 46, and a bottom surface constituted by flanges 47 and 48. The upper edge is provided in its end portions with cable receiving grooves or saddles, as indicated at 54 in FIG. 6, and between the inner ends of these grooves with ridge formation 55. As shown in FIG. 5, the upper surface of ridge 55 is transversely rounded on a radius substantially equal to the radius of cable 10, and the ends of the ridge are inclined so that they fair to the adjacent portions of the cable sections. The arrangement is such that the wheels or sheaves of a cable car may run from the portions of the cable sections received in grooves 54 of the connector onto ridge 55 or off of the ridge onto the adjacent cable portion without any material vertical or lateral movement of the wheels or sheaves relative to the trackway.

Each of the connector parts 51 and 52 is provided with socket formations, as indicated at 56 and 57 in FIG. 3. These socket formations are concave to the outer surfaces of web portions 49 and 50 and are semicircular in cross-sectional shape so that, when members 51 and 52 are assembled together, these formations provide sockets of generally cylindrical shape which receive the corresponding sleeve portions 41 of the corresponding cable end terminal formations 40. Socket formations 56 and 57 are disposed at respectively opposite sides of the mid-length location of connector 11 and are inclined away from the mid-length location and toward the corresponding ends of the upper edge ridge formations 55. Each of the mutually opposed members 51 and 52 is also provided with substantially semicylindrical formations, as indicated at 58 and 59 in FIG. 3, which, when the two connector members are assembled together, provide cable channels leading from the inner ends of the cable-receiving grooves in the upper edge of the connector to the inner ends of the corresponding socket formations 56 and 57. The bore of each channel formation 58 and 59 is materially smaller than and concentric with the corresponding socket 56 or 57 so that each socket has at its inner end an annular wall 60, FIG. 6, against which the thicker end of the corresponding sleeve 41 abuts to transfer the tensional load on the associated cable section 10–a or 10–b to the structure of connector 11. The bores of channel formations 58 and 59 are slightly larger than cable sections 10–a and 10–b and the interiors of the socket formations are slightly larger than sleeves 41 to facilitate the assembly of the cable sections with the connector.

In order to assemble the connector with a pair of cable sections, an end of one cable section is placed adjacent to an end of the other cable section, and the terminal formations on these two ends are then placed one in each socket formation in one part of the connector. The terminal formations are provided on the cable ends before the cable sections are brought to the field assembly position. The other member of the connector is then placed over the first-mentioned member and the portions of the cable sections adjacent the terminal formations are fitted into the channel formations 58 and 59 and extended along the grooves in the end portions of the upper edges of the two mutually opposed members of the connector. Bolts 53 are then inserted through registering apertures in web portions 49 and 50 of the two members and the nuts are applied to these bolts to secure the two mutually opposed members of the connector firmly together. A-frame 14 is then placed in position and bolts 20 and 22 installed to secure the plates carried by the lower end portions of the A-frame legs 15 and 16 to the connector. As the cable sections are connected together in end-to-end relationship, the trackway cable can be raised to operative position on the supporting towers. After a trackway cable has been secured in operative position, struts 25 are mounted in proper locations on cable 12 by the saddle structures 28, and links 30 may then be placed in position and secured to the upper ends of A-frames 14 and struts 25 as described above. The cable sections are secured together by the cable end connectors while the cable sections and the connectors are still on the ground, but after cables 10 and 12 have been raised to operative position, it is a reasonably easy matter to install the frames, struts, and links to hold the connectors in upright position so that the cable car wheels can track across the upper edges of the connectors without danger of leaving the trackway.

I claim:

In an aerial tramway system including a pair of substantially parallel cables, at least one of which cables comprises a series of cable sections arranged in end-to-end relationship and provided with terminal formations of a diameter greater than the diameter of said sections, a cable connector comprising a pair of substantially identical channel-shaped parts, each of said parts having half-socket formations therein which constitute a pair of full sockets receiving corresponding terminal formations when the connector is in assembled condition with cable sections, each of said connector parts having half groove formations in the end portions of one edge thereof to provide cable-receiving grooves at the opposite ends of said connector and half ridge formations between the inner ends of said groove formations to provide a trackway ridge extending between the inner ends of said cable-receiving grooves when said connector is in assembled condition, each of said parts also having half-channel formations extending from the outer ends of said socket formations to the inner ends of the adjacent groove formations, said half-channel formations providing cable channels concentric with and of smaller diameter than said sockets to provide at the outer ends of said sockets annular walls engageable with ends of the corresponding terminal formations when said connector is in assembled condition to retain said terminal formations in said connector, and releasable fasteners securing the two parts of said connector together so that the connector can be easily assembled with adjacent cable end portions while the cables are on the ground; a first leg member secured at one end to said connector and extending upwardly from said connector in laterally offset relationship thereto, said leg member being generally in the shape of an A-frame, the ends of said member being secured to said connector; a saddle member mounted on the other of said cables; a second leg member secured at one end to said saddle member and extending upwardly from said saddle member in laterally offset relationship thereto; a link extending between the upper ends of said first and second leg members; and means rigidly securing said link to said leg members to maintain said connector in a rotational position in which said trackway ridge extends along the upper edge of said connector; said link and said leg members being supported entirely by said cables and each having their longitudinal center lines substantially in a plane perpendicular to the longitudinal center lines of said cables.

References Cited in the file of this patent

UNITED STATES PATENTS

| | | |
|---|---|---|
| 323,984 | Van Depoele | Aug. 11, 1885 |
| 428,071 | Brown | May 20, 1890 |
| 459,737 | Bentley | Sept. 22, 1891 |
| 480,519 | Root et al. | Aug. 9, 1892 |
| 639,240 | Hutchinson | Dec. 19, 1899 |
| 680,901 | Ward et al. | Aug. 20, 1901 |
| 689,610 | Gamalielson | Dec. 24, 1901 |
| 826,340 | Lawson | July 17, 1906 |
| 860,736 | Davy et al. | July 23, 1907 |

(Other references on following page)

UNITED STATES PATENTS

| | | |
|---|---|---|
| 927,325 | Cain | July 6, 1909 |
| 1,149,764 | Hinsen | Aug. 10, 1915 |
| 1,477,386 | Schaake | Dec. 11, 1923 |
| 1,483,516 | McIntosh | Feb. 12, 1924 |
| 1,517,252 | Schaake | Dec. 2, 1924 |
| 1,694,051 | Bardon | Dec. 4, 1928 |
| 1,940,873 | McCafferty | Dec. 26, 1933 |
| 2,095,777 | Wahlberg et al. | Oct. 12, 1937 |
| 2,574,579 | McCoy et al. | Nov. 13, 1951 |
| 2,630,074 | Grabinski | Mar. 3, 1953 |
| 2,855,090 | Zebley | Oct. 7, 1958 |
| 2,896,772 | Diagle | July 28, 1959 |
| 2,901,725 | Schuyler | Aug. 25, 1959 |

FOREIGN PATENTS

| | | |
|---|---|---|
| 187,450 | France | Dec. 7, 1887 |
| 352,856 | Germany | May 6, 1922 |
| 184,422 | Great Britain | Aug. 17, 1922 |